Aug. 11, 1953 — L. FRANCESCHINI — 2,648,221
TENSILE TESTING MACHINE FOR CEMENTING MATERIALS
Filed Aug. 18, 1948 — 2 Sheets-Sheet 1

INVENTOR
Lorenzo Franceschini
BY
Richardson, David and Norton
his ATTORNEYS

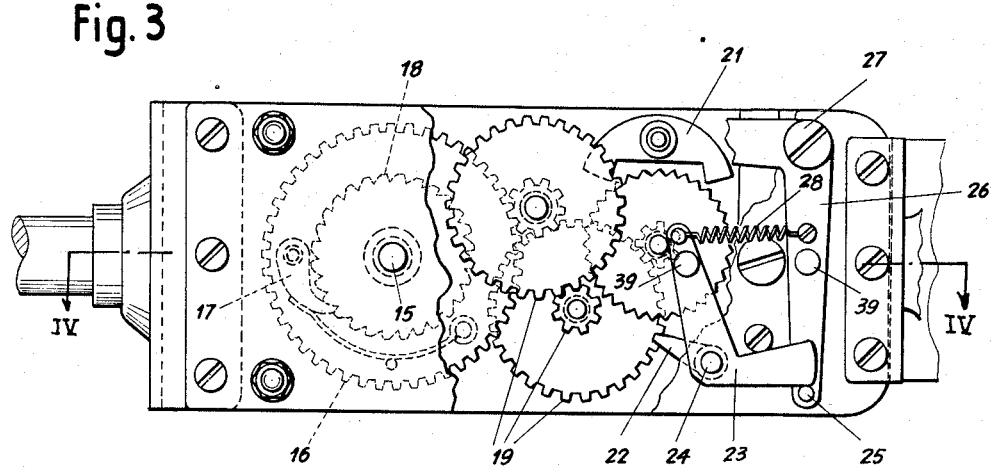
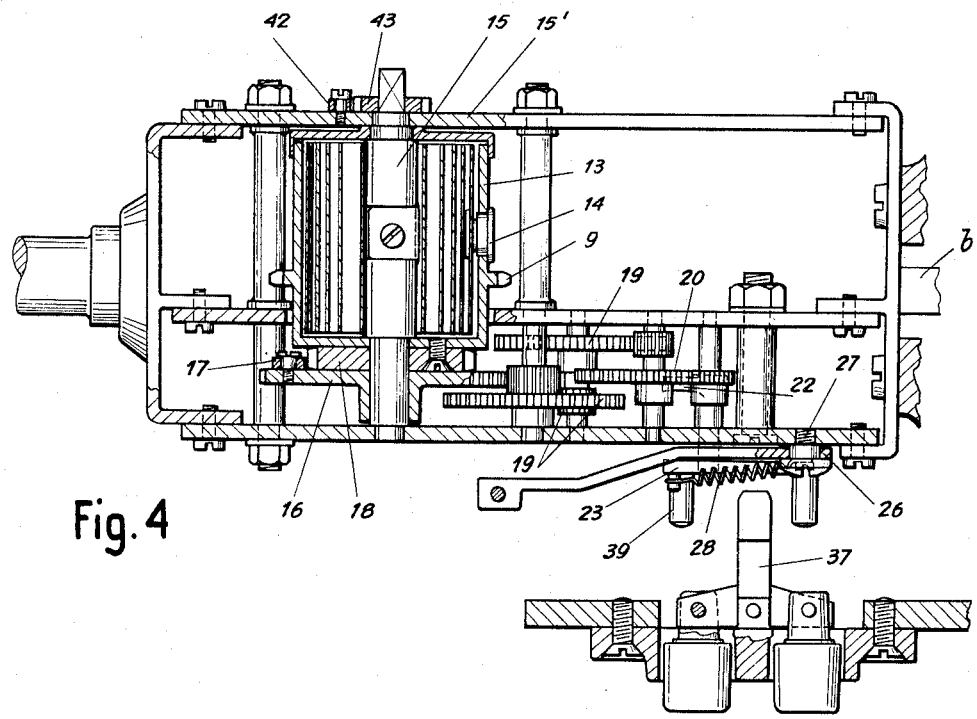

Patented Aug. 11, 1953

2,648,221

UNITED STATES PATENT OFFICE 2,648,221

TENSILE TESTING MACHINE FOR CEMENTING MATERIALS

Lorenzo Franceschini, Firenze, Italy, assignor to Societa per Azioni Officine Galileo, Firenze, Italy, a corporation of Italy Application August 18, 1948, Serial No. 44,934
In Italy August 27, 1947

4 Claims. (Cl. 73—95)

Among the characteristics, generally required by the cementing materials, there is the one referring to the resistance to tensile stress; the relative tests, as it is known, are effected by means of the breaking of appropriate test pieces, constituted by the materials being examined; these test pieces being formed and treated in accordance to the official standard prescriptions and rules.

The machines, which serve for the determinations of the resistance, are well known and it is well known, in the most of the cases, that they are constituted by devices based on an old conception, the characteristics of construction and use of which are distant from those of similar apparatus adapted and operating according to the most modern criterions.

The present invention has for its main objective, a machine which tests the tensile stress of the cementing materials, realizing—by means of an effective approach to more rational conceptions—remarkable advantages in contrast to similar machines being normally used, viz: a greater practicality and rapidity of use, associated with minimum overall dimensions.

The criterions, on which the conception of this machine is based and which, according to the invention, represent, together with the particular constructive development, the main characteristics, are the following. The load corresponding to the breaking of the test piece, is gradually reached in an automatic way and in the same automatic way the cinematic stopping of the entire device is determined, while the results of the effected experiment are ascertained by direct readings.

The device is essentially composed of a lever with two arms having different lengths; a weight of a constant value acts with a variable effective length on one of these arms while the load, represented by the tensile stress, to which the material being tested is submitted, acts on the other constant arm.

It is thus substantially a scale or balance belonging to the so-called steelyard type.

The loading device, which ends in an appropriately shaped tensile hook for the blocking of the test piece, is applied to the constant length arm, which is the shortest. The weight is moved along its respective arm by a special transmission, driven by a mechanism—a spring motor or similar device—controlled by an appropriate speed regulator; the rewinding of said motor is accomplished by the same operation of the weight's carrying back to zero. Consequently, when the motor has been wound for the first time, the device will necessarily be readied after each test for the successive one.

For a greater clarification of the invention, as an exemplification, one embodiment thereof will be described and illustrated with reference to the accompanying drawings.

In the drawings:

Fig. 3 is a lateral view on an enlarged scale of the spring motor, and

Fig. 4 is a horizontal section on the line IV—IV of Fig. 3.

Figure 1:
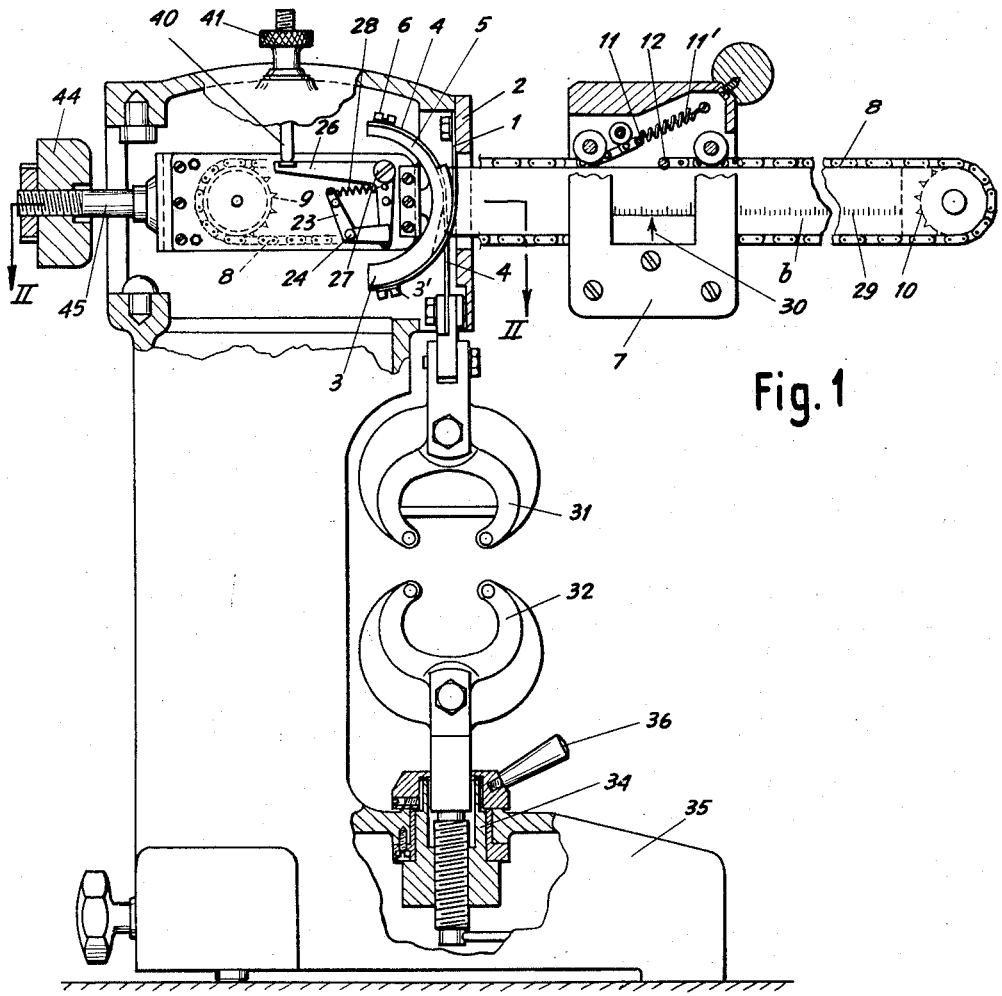
Fig. 1 is a partially sectioned lateral view.
Figure 2:
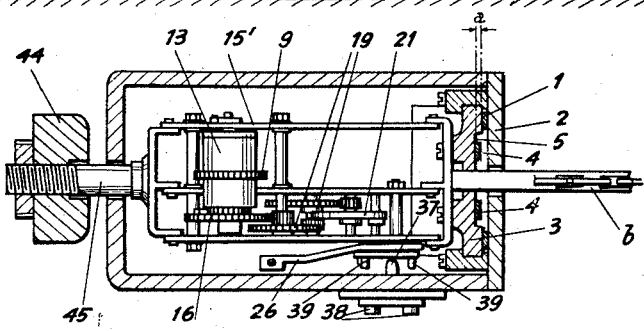
Fig. 2 is a partial horizontal section on the line II—II of Fig. 1.

As already mentioned, the machine, object of the present invention, is essentially constituted by a steelyard, the yoke of which (see Figs. 1 and 2) is hung up by a system 1 of strips (two in the illustration) to the machine frame 2 (which is schematically outlined in the figure); the strips 1 which lie on a cylindrical sector 3 are fixed to an edge of the same sector by appropriate clamps 3'. The load, of which one desires to determine the value by the scale, corresponds, in the present case, to the stress to be applied to the test piece, formed by the material being examined; said stress is transmitted by means of a second system of strips 4, which lie on another cylindrical sector 5 and fixed on this by the clamps 6. The sector 5 is arranged in a substantially concentrically disposed relationship with the sector 3 and has the same direction of the latter but a minor radius: the difference between the radiuses of the two sectors represents the constant length arm $a$ of the yoke (also see Fig. 2).

The weight 7 which determines the load on the test piece, slides along the arm $b$ of the yoke; said sliding is accomplished by means of a flexible transmission (strip, cord, chain or other appropriate means), in the present case a suitable chain 8. The transmission operates in a closed circuit and is extended between a sprocket 9 belonging to the motor device, and being adequately meshed with the same transmission, and an idler sprocket 10 arranged on the end of the arm $b$ of the yoke; the closing of the contiguous ends of the transmission chain is effected by means of the sliding weight 7 at 11 and 12, and in order to guarantee the maintenance of a necessary tension, the anchoring at 11 is realized by a spring 11'.

The sprocket 9 is made solid to a drum 13 containing a spring which is hooked to it at 14; the other end of the spring is fixed to the shaft 15 adequately anchored to the frame 15'. A wheel 16, provided with a ratchet 17 which acts on a saw tooth wheel 18, being made solid to the drum 13, is also mounted loose on the shaft 15 which thus remains fixed; to this wheel, the escapement wheel 20 is connected, by means of an adequate multiplying train of gears 19, and together with the escapement pawl 21 constitutes the escapement unit, which serves for the regulation of the unwinding speed of the spring, driving the drum 13 and sprocket 9 and thus the speed of the chain 8.

The escapement wheel 20 can be blocked by the pawl 22 which is made solid to the square lever 23 pivoted at 24; during the operation of the device, the pawl 22 is kept raised (and thus the escapement wheel 20 can freely rotate) because an arm of said square lever 23 is resting on a pin 25 which is held by a square lever 26 pivoted at 27; the two levers are linked by a spring 28.

The arm *b* is provided with an appropriately graduated scale 29 and the weight 7 carries the index mark 30 and can also be provided with a vernier reading device, all this being arranged in order to facilitate the reading of the observed values.

The operation of the machine is as follows:

The test piece of cement, shaped and treated in accordance with the standard testing specifications, is fixed by the appropriate clamps 31 and 32, having a suitable form; the first of these clamps 31 being connected by the joint 33 and by the strips 4 to the steelyard; the second 32 being connected to a loading device 34 (see Fig. 3), a part of which is made solid to the base 35 of the machine.

By an appropriate action of said loading device (which can also be provided of an adequate clutching device, so arranged that the tensile stress may be uniform in every case), by means of an appropriate control handle 36, the test piece is put under tension. On the assumption that the machine has already served for a preceding test and that the weight 7 has already been moved along the arm *b*, the same weight 7 is manually moved back to the beginning of said arm *b* with the index mark in correspondence with the zero of the graduated scale 29; in consequence of this moving, the displacement of the chain 8, anchored doubly, at both 11 and 12 to the weight 7, determines the rotation of the sprocket 9 and thus of the drum 13 which is made solid to said sprocket, the winding of the spring contained in the drum. When the steelyard yoke is released by a stop device, not shown in the drawing, the square angle lever 23 is rotated by the end of the lever 37 actuated by the start-stop push-bottom 38 outside the machine. The lever 37 abuts against the small pin 39 made solid to the square lever 23.

Following the displacement which is thus determined, the arm of the square lever 23 rests on the pin 25 carried at the lower end of the other square lever 26, by action of the spring 28. The pawl 22 made solid to the lever 23 thus remains raised over the teeth of the escapement wheel 20, which, being free, under the action of main spring and the gear train 16, 19, begins to rotate. These movements determine the displacement of the chain 8 meshed with sprocket 9 and of the weight 7 which is connected to the chain, along the arm *b* and towards the end of the latter. It is obvious that the displacement of the weight 7 will continue along the arm *b* of the steelyard yoke until, by the effect of the same weight, in virtue of the ratio thus established between the two arms of the yoke, a certain stress will be determined, under which the test piece stressed will now break. Releasing suddenly from the load, the steelyard yoke, under the effect of the great lack of equilibrium thus produced, will be displaced from the position, which is practically horizontal, hitherto assumed and maintained by the yoke as a result of the loading rate applied to the sample during the test. In consequence of this movement, the left end of the arm of the square lever 26 will hit against the head of a rod 40 made solid to the support frame of the steelyard, the position of this rod having been previously and purposedly regulated by knurled nut 41. Following this, the square lever 26 overcoming the tension of the spring 28, will rotate on its own pivot 27, while the pin 25 will pass under the arm of the lever 23 which holds the pawl 22. Likewise owing to the same spring 28, this lever 23 will rotate on its own pivot 24, while the pawl 22, coming in contact with the teeth of the gear 20, will block instantaneously all movement. The weight 7 will consequently stop, while by means of the index mark 30 inscribed on an edge of the same weight, the reading of the ultimate load reached can be directly ascertained on the arm *b* of the steelyard and thus can be known the tensile stress, which has been exercised on the test piece and which has determined the breaking thereof.

As already mentioned, before beginning to use the machine, it is provided that a "base winding" can be applied to the spring contained in the drum 13 and this occurs by means of the shaft 15 and the jack system 42, 43 by which said shaft reacts normally against the frame 15'. An operation of balancing the steelyard yoke can be effected by the movable counterweight 44 travelling along the threaded rod 45.

Having now particularly described and ascertained the nature of my said invention and in what manner the same is to be performed, I declare that what I claim is:

1. A testing machine of the class described, comprising: a beam pivoted intermediate its ends to form two arms; means connecting one of said arms to a test specimen; a longitudinally extending graduated scale on the other of said arms and an idler sprocket at the end thereof; a weight movable along said last named arm and having an index for reading the position of said weight along said arm from said graduated scale; a spring driven motor; means for controlling the speed thereof; a sprocket driven by said motor; and a flexible and substantially inextensible chain passing over both of said sprockets and having both of its ends secured to said movable weight to form a closed circuit; and means responsive to a sudden unbalance produced by breakage of said test specimen for stopping further operation of said motor.

2. A machine according to claim 1, including a supporting frame, in which said motor speed controlling means include a shaft and escapement device having a pawl, a lever and a gear so disposed that the gear can be blocked by the pawl and held by the lever, a spring actuating said lever, a second lever effecting disengagement of the first lever and a stop on said frame, said second lever, upon breakage of the material to be tested, abutting said stop when said beam tends to incline from the horizontal.

3. A machine according to claim 1, including means connecting said motor and said chain so that shifting of said weight, towards the pivot of the beam, and consequent moving of said chain will rewind said motor, said last means including a jack located between the motor and the shaft so as to withstand the spring tension, whereby an initial winding tension can be given the motor via the shaft, so as to assure certain operation of the machine.

4. A machine according to claim 1, further comprising spring means carried by said weight and connected to one end of said chain for maintaining a tension therein.

LORENZO FRANCESCHINI.

References Cited in the file of this patent

UNITED STATES PATENTS

| Number | Name | Date |
|---|---|---|
| 534,994 | Busby | Mar. 5, 1895 |
| 1,837,577 | Nessler | Dec. 22, 1931 |